United States Patent
Kang et al.

(10) Patent No.: US 7,330,742 B2
(45) Date of Patent: Feb. 12, 2008

(54) PORTABLE COMMUNICATION DEVICE AND METHOD OF SENSING CAMERA OPERATION MODE IN THE PORTABLE COMMUNICATION DEVICE

(75) Inventors: Sung-Ill Kang, Gumi-si (KR); Tae-Yun Kim, Gumi-si (KR); Jong-Gun Bae, Gumi-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 565 days.

(21) Appl. No.: 10/799,651

(22) Filed: Mar. 15, 2004

(65) Prior Publication Data

US 2005/0020239 A1    Jan. 27, 2005

(30) Foreign Application Priority Data

Jul. 23, 2003    (KR)    ...... 10-2003-0050644

(51) Int. Cl.
*H04M 1/00*    (2006.01)

(52) U.S. Cl. ............... 455/575.3; 455/556.1; 361/814

(58) Field of Classification Search ............ 455/90.3, 455/575.3, 575.1, 556.1, 556.2, 550.1; 361/814; 396/434, 429

See application file for complete search history.

(56) References Cited

U.S. PATENT DOCUMENTS

| | | | | |
|---|---|---|---|---|
| 5,410,141 A | * | 4/1995 | Koenck et al. | ........ 235/472.02 |
| 6,125,289 A | * | 9/2000 | Lee | ........... 455/575.3 |
| 6,701,166 B2 | * | 3/2004 | Lim | ........... 455/575.3 |
| 6,865,400 B2 | * | 3/2005 | Oh et al. | ........... 455/556.2 |
| 6,975,890 B2 | * | 12/2005 | Wu et al. | ........... 455/575.1 |
| 7,020,504 B2 | * | 3/2006 | Lim | ........... 455/575.3 |
| 7,076,280 B2 | * | 7/2006 | Oshima | ........... 455/575.3 |
| 7,092,626 B2 | * | 8/2006 | Hirai | ........... 396/176 |
| 2004/0048633 A1 | * | 3/2004 | Sato et al. | ........... 455/556.1 |
| 2004/0077388 A1 | * | 4/2004 | Crum | ........... 455/575.3 |
| 2004/0204122 A1 | * | 10/2004 | Opela et al. | ........... 455/565 |

* cited by examiner

*Primary Examiner*—Lewis West
(74) *Attorney, Agent, or Firm*—Roylance, Abrams, Berdo & Goodman, LLP

(57) ABSTRACT

A portable communication device including a first housing and second housing, wherein the second housing is connected to the first housing so that it is rotatable around a first hinge axis while facing a top surface of the first housing to allow movement toward or away from the first housing. The device also includes a third housing connected to the second housing so that it is rotatable around the first hinge axis while facing the top surface of the first housing to allow movement toward or away from the first housing, and rotatable around a third hinge axis to allow rotational movement of a display. A battery pack, serving as a grip, is connected to the first housing so that it is rotatable around a third hinge axis while facing a bottom surface of the first housing to allow movement toward or away from the first housing. A sensing unit is provided to sense whether the battery pack is rotated.

10 Claims, 8 Drawing Sheets

PORTABLE COMMUNICATION DEVICE AND METHOD OF SENSING CAMERA OPERATION MODE IN THE PORTABLE COMMUNICATION DEVICE

CROSS-REFERENCE TO RELATED APPLICATIONS

This application claims priority under 35 U.S.C. § 119 to an application entitled "Portable Communication Device and Method of Sensing Camera Operation Mode in the Portable Communication Device" filed in the Korean Intellectual Property Office on Jul. 23, 2003 and assigned Serial No. 2003-50644, the entire content of which is incorporated herein by reference.

BACKGROUND OF THE INVENTION

1. Field of the Invention

The present invention relates generally to a portable communication device such as a cellular phone, a Personal Digital Assistant (PDA), or a Hand-Held Phone (HHP), and in particular, to a portable communication device that allows an easy transition to a call mode or a camera operation mode, thereby facilitating photographing.

2. Description of the Related Art

A portable communication device usually refers to an electronic device that can be carried around with a user, allowing the user to wirelessly communicate with another party. To promote the portability of the portable communication device, it is designed to be smaller, more slim and more lightweight, while providing a better grip. Regarding function, the portable communication device is developed to support multimedia service with a variety of functions. It is expected from current trends that small, light, multi-function and multi-purpose portable communication devices will be implemented adaptively according to diverse multimedia and Internet environments. Along with the rapid worldwide proliferation of portable communication devices with users irrespective of gender and age, they are now seen as a necessity to daily living.

Existing portable communication devices are typically categorized into a bar type, a flip type and a folder type according to their looks. The bar type is configured to have a bar-shaped single housing. The flip type is configured such that a flip or cover is rotatably mounted to a bar-shaped housing by means of a hinge device, and the folder type is configured such that a folder is rotatably mounted to a bar-shaped housing by means of a hinge device so that it is foldable.

These portable communication devices can further be categorized into a neck-wearable type and a wrist type according to where or how a user carries them around. The neck-wearable type portable communication device is worn around the neck of a user by means of a strap, while the wrist type portable communication device is worn around his hand.

According to their opening mechanisms, the portable communication devices are further classified into a rotation type and a sliding type. The rotation type is so configured that one of two housings is rotated to an open/closed state with respect to the other housing while facing the other housing. The sliding type is configured such that one of two housings slides to an open/closed state along the other housing. The above classifications of the portable communication devices are known to those skilled in the art.

To satisfy increasing user demands, the portable communication devices have been developed to support high-rate data transmission as well as voice communication. Hence, they will provide services using wireless communication technology for high-rate data communication.

An existing portable communication device typically adopts a camera lens to transmit video signals at a preset condition. A camera lens module is built-in or provided as a separate device in the portable communication device to conduct a video call or photograph an object therewith.

As described above, with the widespread use of portable terminals by users irrespective of gender and age, such as PDA, cellular phone, HHP, and digital phone devices, users carry these portable terminals with them and wirelessly communicate with other parties. Hence, the portable terminals are often considered a necessity, and ongoing demands ensure multi-functional portable terminals will emerge in the future.

Besides function, design is a very significant factor that determines the value of the portable terminals. Although users repair portable terminals or purchase new ones when they are out of order, they often purchase brand-new models simply to reveal personal tastes. This trend is becoming widespread. In other words, when portable terminals feel monotonous or boring to their users, they tend to be replaced by the latest versions. This implies that consumers see portable terminals as a critical tool to show their sense of fashion.

Accordingly, a need exists for a portable communication device to provide a unique sense of fashion and style, satisfying a user demand for use convenience as a necessity. In addition, a need exists for the portable communication device to facilitate user manipulation in a camera operation mode.

SUMMARY OF THE INVENTION

An object of the present invention is to substantially solve at least the above problems and/or disadvantages and to provide at least the advantages below. Accordingly, an object of the present invention is to provide a portable communication device that facilitates photographing.

Another object of the present invention is to provide a portable communication device having a battery pack serving as a grip.

The above objects are achieved by providing a portable communication device, and a method of sensing a camera operation mode in the portable communication device.

In accordance with one aspect of the present invention, a portable communication device includes a first housing. A second housing is connected to the first housing so that it is rotatable around a first hinge axis while facing a top surface of the first housing, allowing movement toward or away from the first housing. A third housing is connected to the second housing so that it is rotatable around the first hinge axis while facing the top surface of the first housing, allowing movement toward or away from the first housing, and rotatable around a second hinge axis independent of the first hinge axis. A battery pack, serving as a grip, is connected to the first housing so that it is rotatable around a third hinge axis while facing a bottom surface of the first housing, allowing movement toward or away from the first housing. A sensing unit senses whether the battery pack is rotated or not.

In accordance with another aspect of the present invention, a portable communication device includes a first housing. A second housing is connected to the first housing so that it is rotatable around a first hinge axis while facing a top surface of the first housing, allowing movement toward or away from the first housing. A third housing is connected to the second housing so that it is rotatable around the first hinge axis while facing the top surface of the first housing, allowing movement toward or away from the first housing, and rotatable around a second hinge axis independent of the first hinge axis. The second hinge axis is perpendicular to the first hinge axis and rotatable with respect to the first hinge axis along with the rotation of the third housing. A battery pack, serving as a grip, is connected to the first housing so that it is rotatable around a third hinge axis while facing a bottom surface of the first housing, allowing movement toward or away from the first housing. The third hinge axis is perpendicular to the first and second hinge axes. A sensing unit senses whether the battery pack is rotated or not.

In accordance with a further aspect of the present invention, in a method of performing a call termination service in a camera operation mode set for photographing an object in a portable communication device, the device includes a first housing with at least one Hall sensor, and a battery pack serving as a grip, having at least one magnet, and being connected to the first housing. When a communication is attempted during photographing, the camera operation mode is discontinued and the state of the battery pack is determined. If the battery pack is rotated, a speaker phone is activated and the call termination service is performed.

In accordance with still another aspect of the present invention, in a method of performing a call origination service in a camera operation mode set for photographing an object in a portable communication device, when a communication is attempted during photographing, the camera operation mode is discontinued. It is then determined whether the communication is related to a call termination service or a call origination service. If the communication is related to the call origination service, the call origination service is performed.

BRIEF DESCRIPTION OF THE DRAWINGS

The above and other objects, features and advantages of the present invention will become more apparent from the following detailed description when taken in conjunction with the accompanying drawings in which.

DETAILED DESCRIPTION OF THE PREFERRED EMBODIMENTS

A preferred embodiment of the present invention will be described herein below with reference to the accompanying drawings. In the following description, functions or constructions well known to those skilled in the art are not described in detail since they would obscure the invention in unnecessary detail.

The embodiment of the present invention provides a portable communication device configured to have three plate-shaped housings and a battery pack serving as a grip rotatably connected to one another in the manner that facilitates user manipulation, especially in photographing an object.

Referring to FIGS. 1 to 4, an example portable communication device according to an embodiment of the present invention comprises a first housing 10, a second housing 20 connected to the first housing 10 so that it is rotatable around a first hinge axis A1, a third housing 30 connected to the second housing 20 so that it is rotatable around the first hinge axis A1 and a second hinge axis A2, and a battery pack 40 serving as a grip, connected to the first housing 10 so that it is rotatable around a third hinge axis A3.

Figure 1:
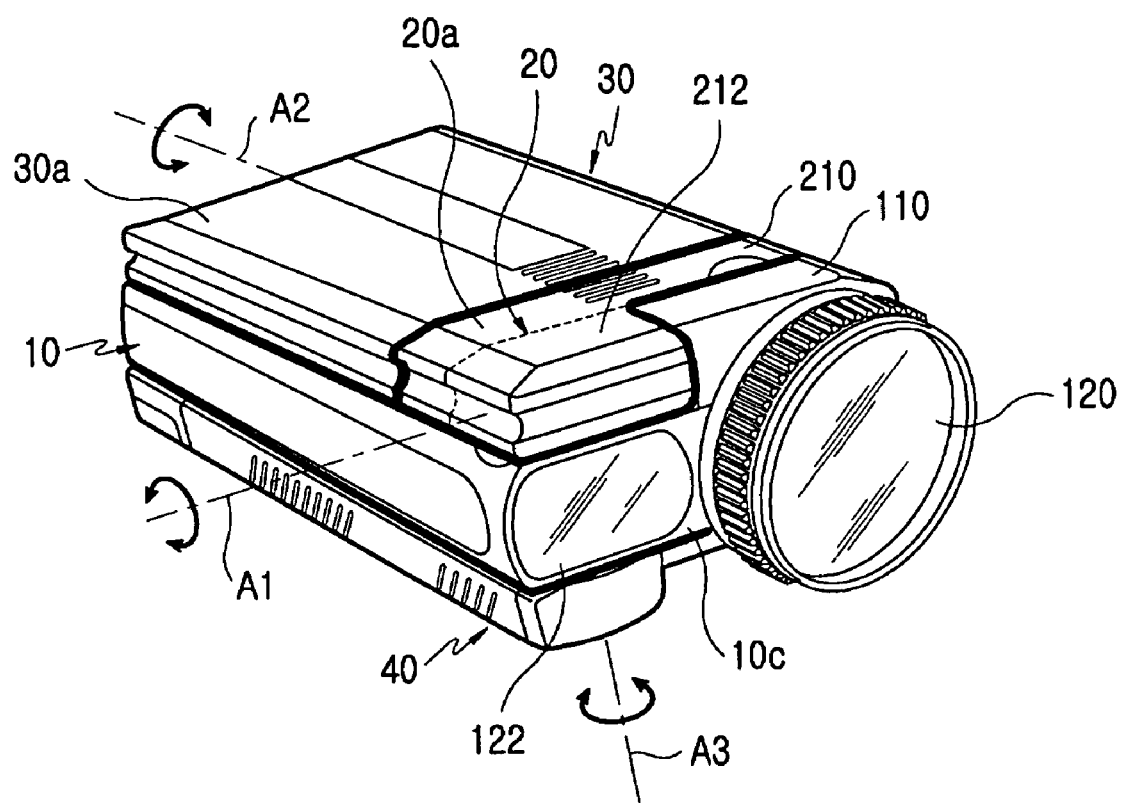
FIG. 1 is a perspective view illustrating the front part of an example portable communication device according to an embodiment of the present invention.
Figure 2:
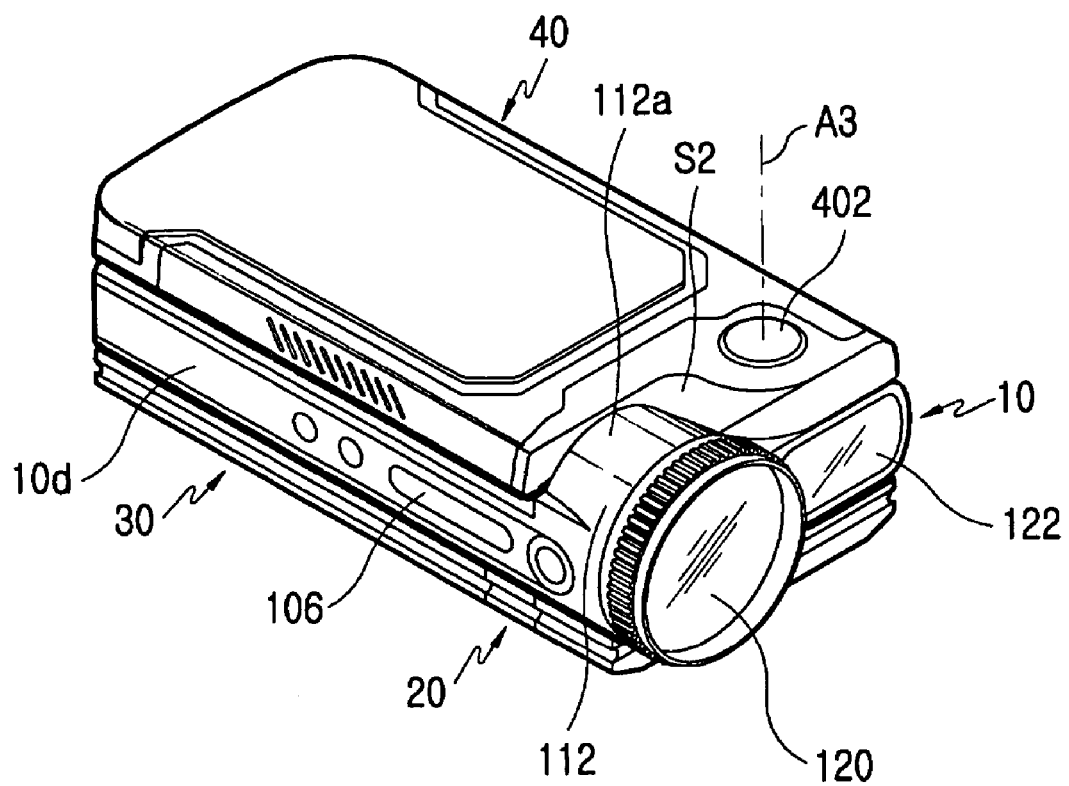
FIG. 2 is a perspective view illustrating the rear part of the portable communication device according to an embodiment of the present invention.
Figure 3:
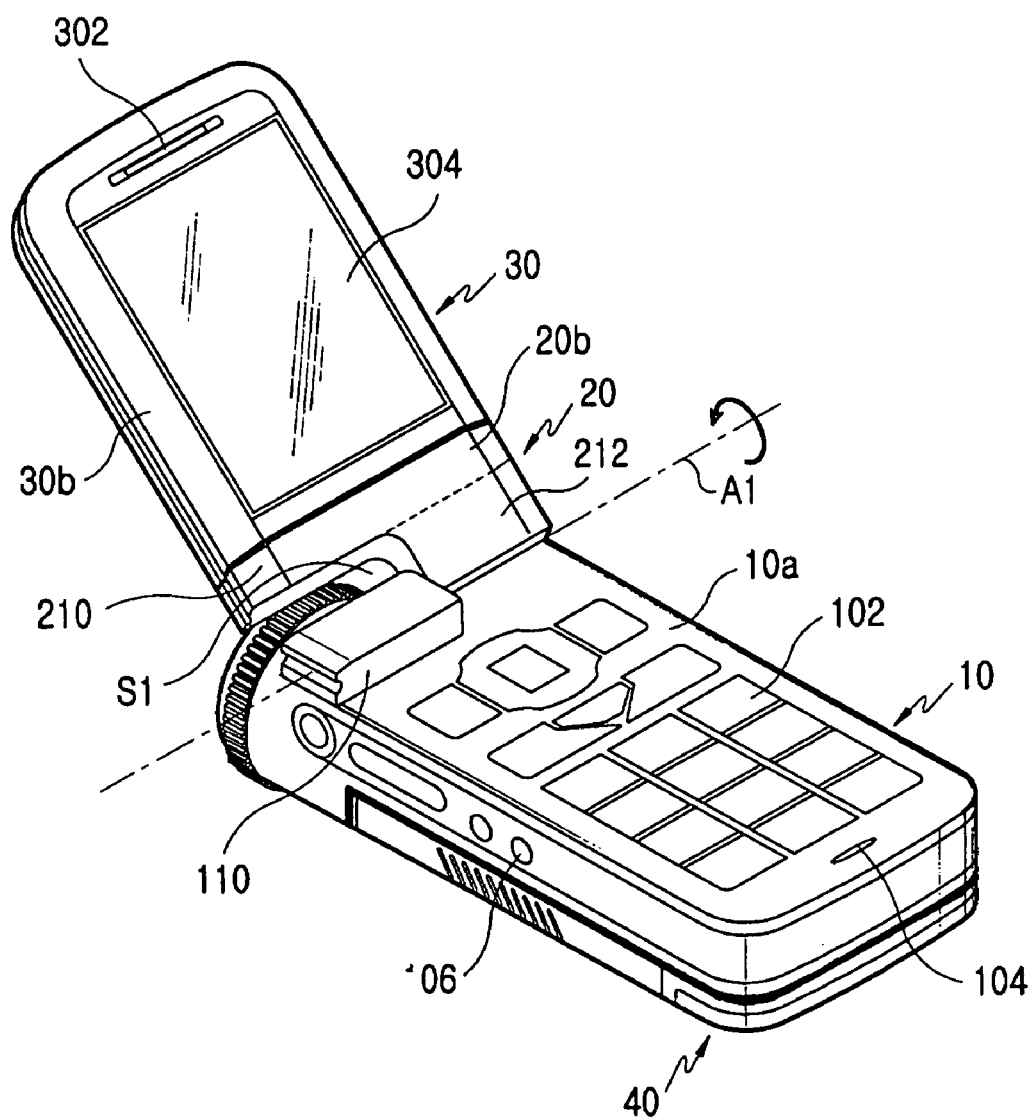
FIG. 3 is a perspective view of the portable communication device in a state where a second housing is opened around a first hinge axis according to an embodiment of the present invention.

As shown in FIG. 3, the second housing 20 rotates while facing the first housing 10 such that it travels toward or away from the first housing 10. The third housing 30 is connected to the second housing 20 such that it rotates while facing the first housing 10 to travel toward or away from the first housing 10. The battery pack 40 is connected to the first housing 10 such that it rotates while facing the first housing 10 to travel toward or away from the first housing 10.

The rotation of the second and third housings 20 and 30 occur over a top surface 10a of the first housing 10, while the rotation of the battery pack 40 occurs over a bottom surface 10b thereof.

The second hinge axis A2 is perpendicular to the first hinge axis A1, and the third hinge axis A3 is perpendicular to both the first and second hinge axes A1 and A2.

The first housing 10 includes the top surface 10a, side surfaces 10d, a front surface 10c, and the bottom surface 10b. On the top surface 10a of the first housing 10 are arranged a first hinge arm 110 protruding upward, one or more first keys 102 in the vicinity of the first hinge arm 110, and a microphone 104 in the vicinity of the first keys 102. One or more second keys 106 are positioned on one of the side surfaces 10d of the first housing 10. A camera lens window 120, directed in a front direction, and a lighting unit 122, positioned in line with the camera lens window 120 for emitting light in the front direction, are on the front surface 10c of the first housing 10. The camera lens window 120 is mounted at the outermost periphery of a cylindrical lens housing 112 formed on the front surface 10c of the first housing 10 and faces the front direction. The camera lens window 120 is provided with a camera lens (not shown) therein. The lens housing 112 is positioned near the first hinge arm 110 and a circumferential portion 112a thereof protrudes from the bottom surface 10b of the first housing 10. The portion 112a of the lens housing 112 restricts the rotational movement of the battery pack 40.

The second housing 20 includes a planar top surface 20a and a planar bottom surface 20b. The second housing 20 is provided with a second hinge arm 212 that defines the first hinge axis A1 when it is aligned with the first hinge arm 110, a first slot S1 formed near the second hinge arm 212, and a connecting arm 210 integrated with the second hinge arm 212.

The third housing 30 includes a top surface 30a and a bottom surface 30b. The top surface 30a is planar, while the bottom surface 30b is provided with a speaker 302 thereon and a display 304 near the speaker 302. The display 304 can be a known Liquid Crystal Display (LCD) module or a touch-sensitive panel.

The battery pack 40 is mounted to the bottom surface 10b of the first housing 10 by means of a hinge shaft 402 so that the battery pack 40 is rotatable around the third hinge axis A3 up to at or about 90° to at or about 100°. The battery pack 40 is provided with a second slot S2 for preventing interference with the lens housing 112.

Figure 4:
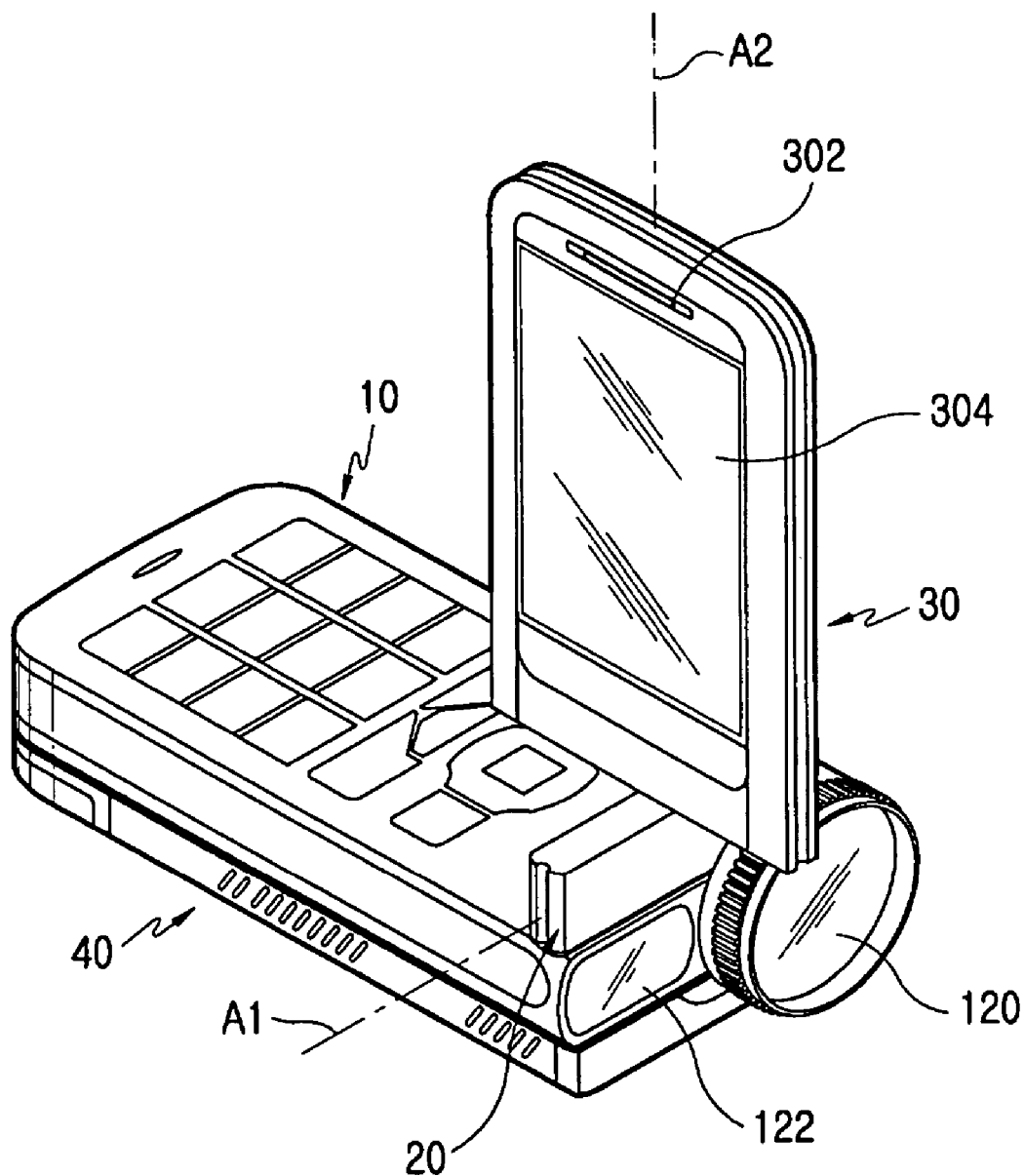
FIG. 4 is a perspective view of the portable communication device in a state where a third housing is rotated around a second hinge axis according to an embodiment of the present invention.
Figure 5:
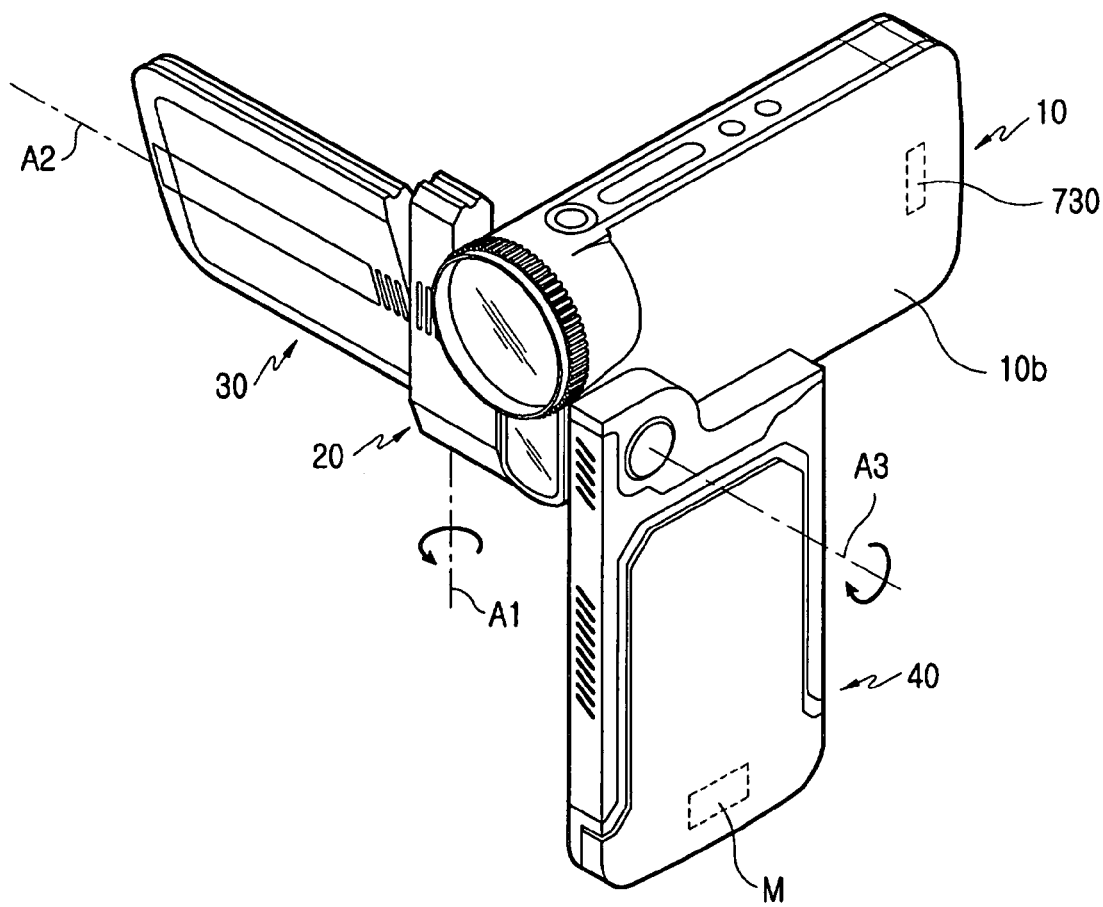
FIGS. 5 and 6 are perspective views of the portable communication device operating in a camera operation mode according to an embodiment of the present invention.

As shown in FIG. 5, a user rotates the battery pack 40 at or about 90° around the third hinge axis A3 and then grips the battery pack 40. Subsequently, the user then rotates the second housing 20 around the first hinge axis A1 and rotates the third housing 30 at a desired angle around the second hinge axis A2, to thereby photograph an object at a desired position. FIGS. 3 to 6 illustrate the operational states of the example portable communication device in accordance with an embodiment of the present invention.

Figure 6:
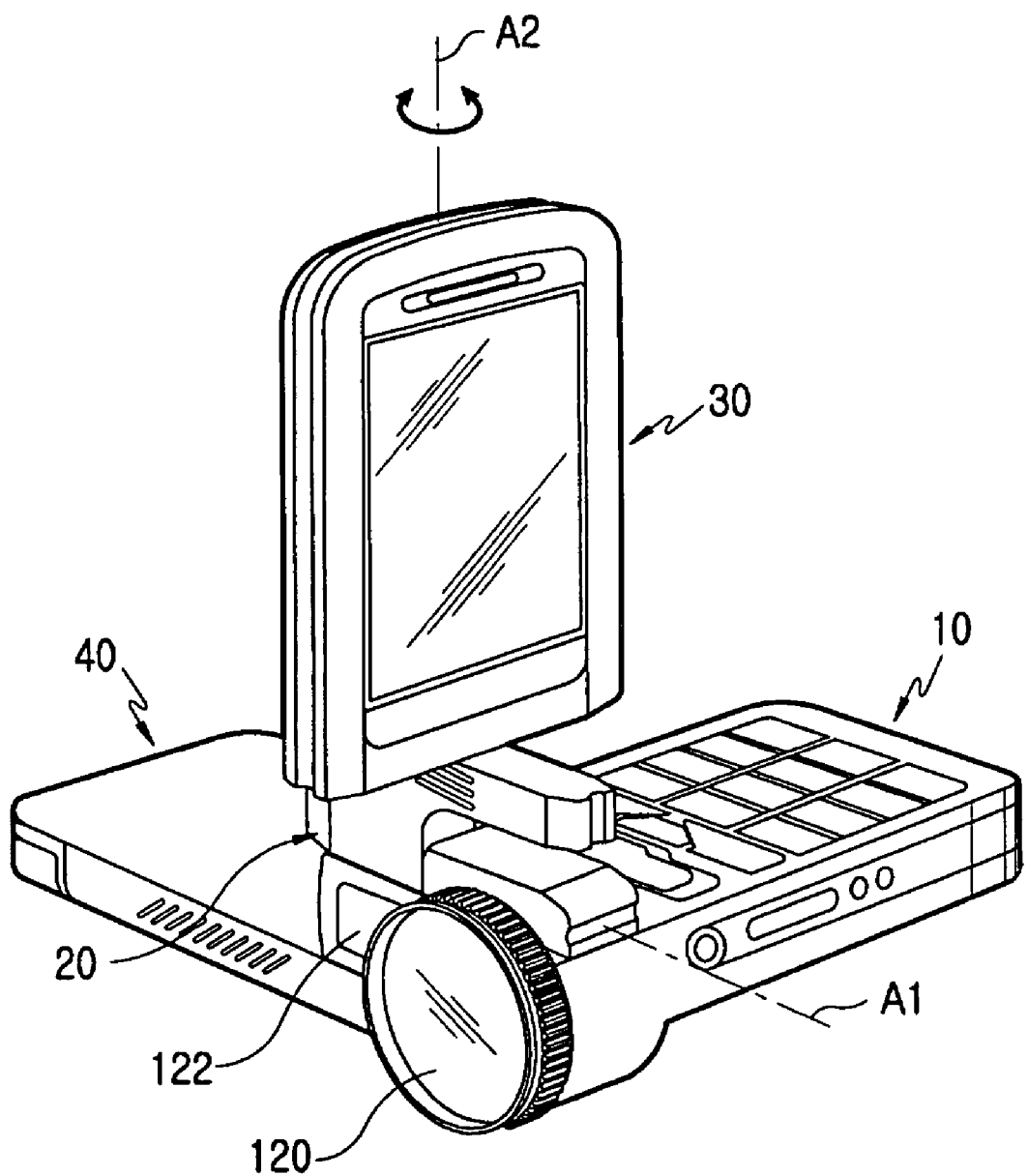

FIG. 3 illustrates a call mode of the portable communication device and FIGS. 4, 5 and 6 illustrate a camera operation mode of the portable communication device.

Regarding the rotation of the housings, the second housing 20 can rotate from the first housing 10 in a range of at or about 130° to at or about 180°, the third housing 30 can rotate from the second housing in a range of at or about 20° up to at or about 180°, and the battery pack 40 can rotate in a range of up to at or about 90° to at or about 100°.

Figure 7:
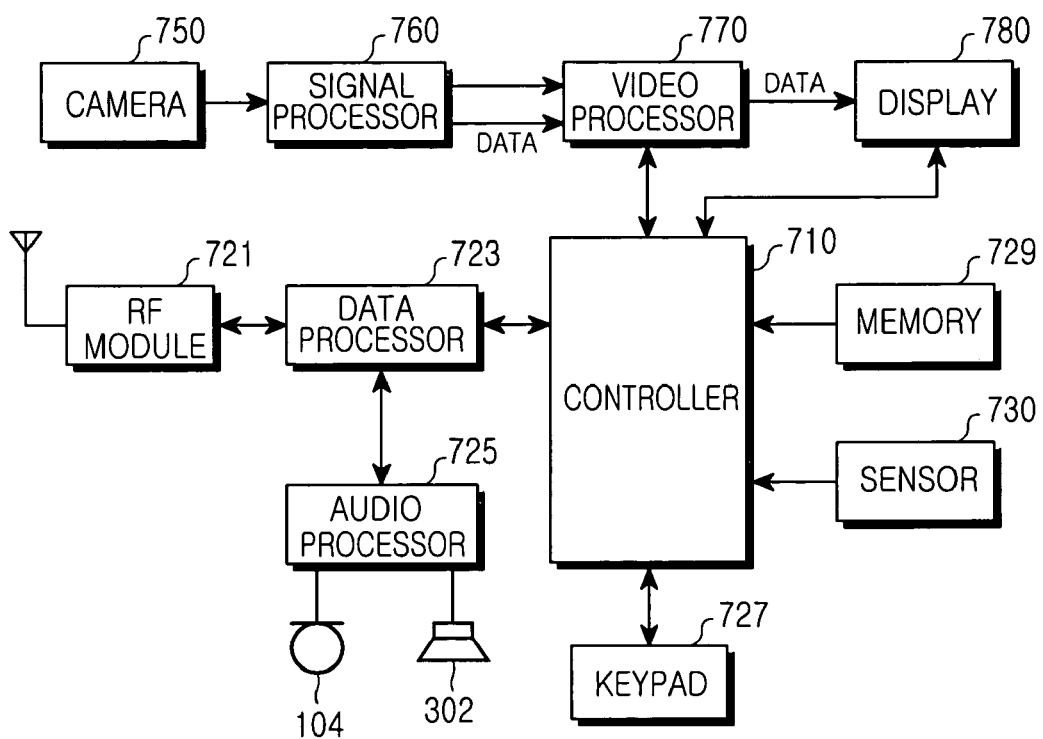
FIG. 7 is an example block diagram of the portable communication device according to an embodiment of the present invention.
Figure 8:
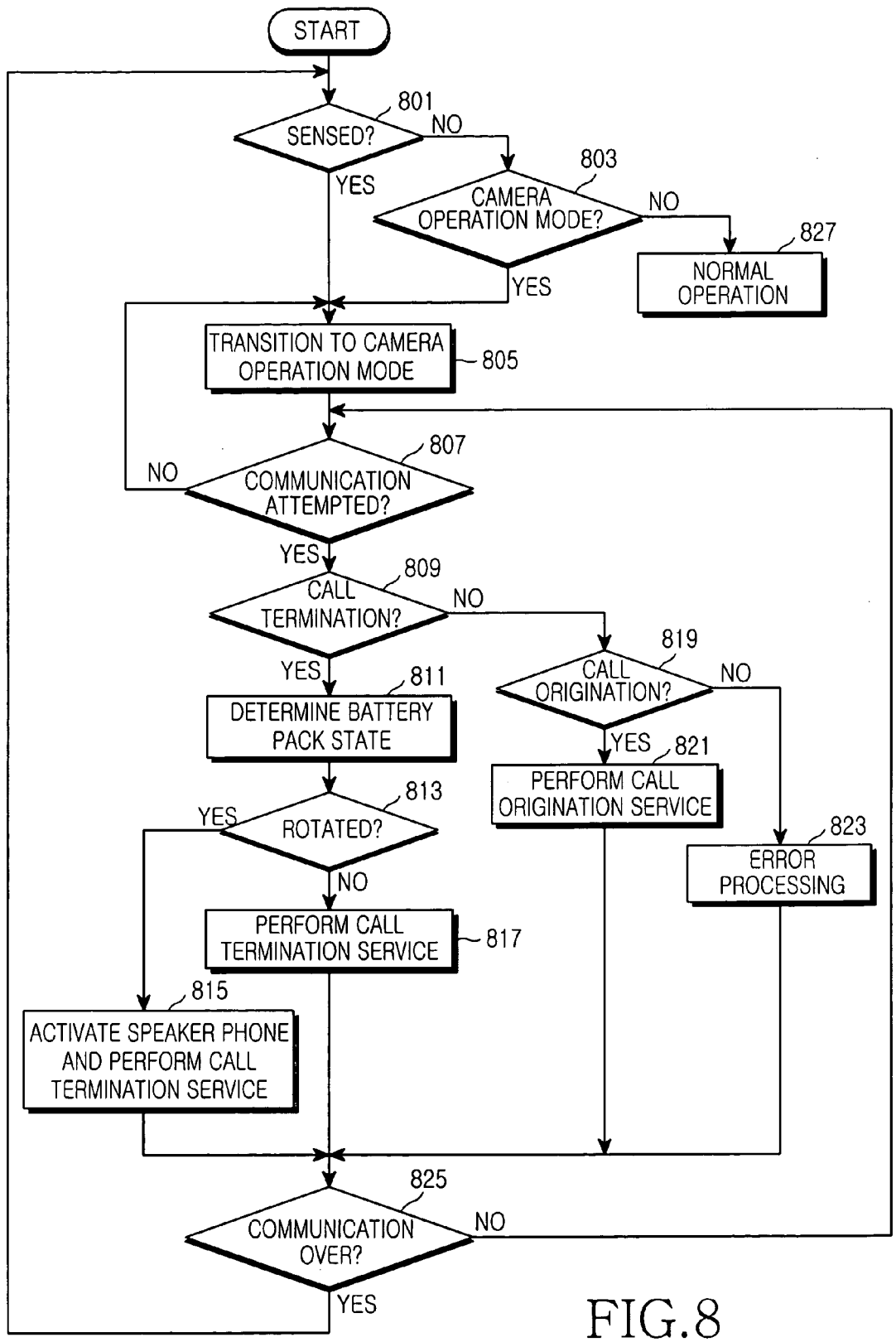
FIG. 8 is a flowchart illustrating an example control operation of a controller for communication in the camera operation mode in the portable communication device according to an embodiment of the present invention.

With reference to FIGS. 7 and 8, a method of sensing a transitioned mode in the portable communication device configured as described above will be described in greater detail below.

Referring to FIG. 7, a Radio Frequency (RF) module 721 is used for the overall communications of the portable communication device. The RF module 721 includes an RF transmitter for upconverting and amplifying the frequency of a transmission signal, and an RF receiver for low-noise amplifying and downconverting a received signal. A data processor 723 includes a transmitter for encoding and modulating the transmission signal and a receiver for demodulating and decoding the received signal. The data processor 723 may comprise a MODEM and CODEC. An audio processor 725 reproduces an audio signal received from the data processor 723, or transmits an audio signal received from a microphone 104 to the data processor 723. The speaker 302 can reproduce the audio signal, or transmit a received voice signal to the audio processor 725. The speaker 302 is a general speakerphone.

A keypad 727 is provided with keys 102, including keys with which to enter digits and characters, and function keys with which to invoke functions. The function keys include a camera operation mode key. The camera operation mode key is used to transition to a camera operation mode. The camera operation mode can be set using a navigation key, a digit key, a character key, etc., for inputting video data. In the camera operation mode, a photographing program is executed. The execution of the photographing program is beyond the scope of the present invention and thus its description is not provided here.

A memory 729 may include a program memory and a data memory. The program memory can store programs for controlling the typical operations of the portable communication device and programs for controlling the operations of the portable communication device in a camera operation mode or a call mode. The data memory temporarily stores data generated during executing the programs or externally received data.

A camera 750 is provided to capture images. It can include a camera sensor for converting an optical signal corresponding to a captured image to an electrical signal. The camera sensor can be a Charge Coupled Device (CCD) sensor, such as the sensor provided herein. While the embodiment of the present invention is shown with the camera 750 built-in, in yet another embodiment the camera 750 can be implemented as a separate device which is connected to the portable communication device when used.

A signal processor 760 is provided and converts an image received from the camera 750 to an image signal. The signal processor 760 can be implemented as a digital signal processor (DSP). A video processor 770 generates video data to represent the image signal. The video processor 770 transmits a video signal received under the control of a controller 710 according to a signal format suitable for a display 780. Additionally, the video processor 770 compresses or decompresses the video data.

A sensor 730 is provided and senses the position of the battery pack 40. A magnet M and a Hall sensor can be used to sense the position of the battery pack 40. Two cases, or positions, are sensed. One is a position wherein the magnet approaches the Hall sensor which indicates a non-rotated state of the battery pack 40. The other is a position wherein the magnet is withdrawn from the Hall sensor which indicates a rotated state of the battery pack 40. The sensor 730 is not limited to the Hall sensor and thus it can include any number of sensors relying on the same principle, such as a proximity sensor or a magnetic sensor. The sensor 730 operates by sensing the inside or outside of a magnetic field. The magnet M is attached to the battery pack 40 and the sensor 730 can be mounted to the first housing 10 for outputting a sensing signal according to the field of the magnet M as illustrated in FIG. 5. Preferably, the magnet M can be attached to the first housing 10, while the sensor 730 is mounted to the battery pack 40.

The controller 710 provides overall control to the operations of the portable communication device. It can incorporate the data processor 723 therein. The controller 710 also sets a camera operation mode according to the sensing signal received from the sensor 730 or a key signal received from the keypad 727. The transitioning to the camera operation mode will be described in greater detail below.

The display 780 can be any number of mechanisms, such as an LCD. In this case, the display 780 is provided with an LCD controller, a memory for storing video data, and an LCD display device 304. The display 780 displays a video signal received from the video processor 770.

FIG. 8 is a flowchart illustrating an example control operation in the controller for communications in a camera operation mode in the portable communication device according to the embodiment of the present invention. With reference to FIGS. 7 and 8, the control operation in the case of communications in the camera operation mode will be described.

In step 801, the controller 710 determines whether a sensing signal has been received from the sensor 730. The sensing signal is generated when the battery pack is rotated. As described above, the rotation of the battery pack can be sensed by means of the magnet M and the Hall sensor. Upon receipt of the sensing signal, the controller 710 proceeds to step 805 or otherwise, it goes to step 803. In step 803, the controller 710 determines the present mode. If the present mode is not the camera operation mode, the controller 710 proceeds to step 827. If the present mode is the camera operation mode, the controller 710 proceeds to step 805. In step 805, the controller 710 transitions to the camera operation mode so that the user can photograph an object.

In step 807, the controller 710 determines whether a communication is initiated in the camera operation mode. If the communication is not initiated, the controller 701 repeats steps 805. However, if the communication is attempted, the controller 710 discontinues the camera operation mode operation and goes to step 809.

In step 809, the controller 710 determines whether the communication is related to a call termination. If it is not, the controller 710 goes to step 819. If it is, the controller 701 goes to step 811. In step 811, the controller 710 locates the battery pack 40 in the above-described manner. The controller 710 then determines whether the battery pack 40 has been rotated in step 813. If it has, the controller 710 goes to step 815. If it has not, the controller 710 goes to step 817. The controller 710 then performs a call termination service in step 817 and proceeds to step 825. The call termination-related communication includes answering an incoming call, or reception of a text or voice message. The call termination service is a process of performing call termination-associated operations.

In step 815, the controller 710 activates the speakerphone and performs an associated operation to allow the user to conduct the voice call as shown in the state illustrated in FIG. 5 or 6, and then goes to step 825. Specifically, the controller 710 disables the microphone while controlling the audio processor 725 to use the speaker as a speakerphone. The user transitions from the state illustrated in FIG. 5 or 6, to the state illustrated in FIG. 3, for the voice call.

Returning to step 809, if the controller 710 determines the communication is not related to a call termination, the controller 710 then determines whether the communication is an outgoing call in step 819. If it is not, the controller 710 goes to step 823 and if it is, the controller 710 proceeds to step 821. The controller 710 then performs a call origination service in step 821 and goes to step 825. The call origination-related communication includes calling, or transmission of a text or voice message. The call origination service is a process of performing call origination-related operations.

If the communication is not an outgoing call in step 819, the controller 710 goes to step 823. The controller 710 processes errors in step 823 and goes to step 825. These include errors which are from neither the call origination nor from the call termination. They are unpredictable errors.

In step 825, the controller 710 determines whether the communication is over. If the communication continues, the controller 710 returns to step 807. If the communication is over, the controller 710 returns to step 801.

In such a manner, the controller 710 performs normal operations like termination of the camera operation mode, the call origination service, or the call termination service, specifically including a voice call or transmission of a text or short message.

As described above, the inventive portable communication device comprises three housings and a battery pack serving as a grip, which are configured to rotate around three hinge axes with respect to one another. Therefore, the user can effectively photograph an object while gripping the battery pack. Furthermore, an automatic mode transition contributes to improved use convenience.

While the invention has been shown and described with reference to a certain preferred embodiment thereof, it will be understood by those skilled in the art that various changes in form and details may be made therein without departing from the spirit and scope of the invention as defined by the appended claims.

What is claimed is:

1. A portable communication device comprising:
   a first housing;
   a second housing connected to the first housing so that the second housing is rotatable around a first hinge axis while facing a top surface of the first housing to allow movement toward or away from the first housing;
   a third housing connected to the second housing so that the third housing is rotatable around the first hinge axis while facing the top surface of the first housing to allow movement toward or away from the first housing and is further rotatable around a second hinge axis;
   a battery pack serving as a grip, the battery pack being connected to the first housing so that the battery pack is rotatable around a third hinge axis while facing a bottom surface of the first housing, to allow movement toward or away from the first housing; and
   a sensing unit for sensing whether the battery pack is rotated.

2. The portable communication device of claim 1, wherein the first housing comprises:
   one or more keys and a microphone disposed near the first keys on the top surface of the first housing;
   one or more second keys on a side surface of the first housing; and
   a camera lens window and a lighting unit aligned with each other and disposed facing a front direction on a front surface of the first housing.

3. The portable communication device of claim 1, wherein the third housing includes a planar top surface and a bottom surface, the third housing comprising a speaker and a display disposed near the speaker on the bottom surface thereof.

4. The portable communication device of claim 1, wherein the battery pack is plate-shaped.

5. A portable communication device comprising:
   a first housing;
   a second housing connected to the first housing so that the second housing is rotatable around a first hinge axis while facing a top surface of the first housing to allow movement toward or away from the first housing;
   a third housing connected to the second housing so that the third housing is rotatable around the first hinge axis while facing the top surface of the first housing to allow movement toward or away from the first housing and is further rotatable around a second hinge axis, the second hinge axis being perpendicular to the first hinge axis and rotatable with respect to the first hinge axis along with the rotation of the third housing;
   a battery pack serving as a grip, the battery pack being connected to the first housing so that the battery pack is rotatable around a third hinge axis while facing a bottom surface of the first housing to allow movement toward or away from the first housing, the third hinge axis being perpendicular to the first and second hinge axes; and
   a sensing unit for sensing whether the battery pack is rotated.

6. The portable communication device of claim 5, wherein the first housing comprises:

a first protruding hinge arm, one or more keys disposed near the first hinge arm, and a microphone disposed near the first keys on the top surface of the first housing;

one or more second keys disposed on a side surface of the first housing; and a camera lens window disposed near the first hinge arm and the third hinge axis, and a lighting unit disposed near the camera lens window, the camera lens window and the lighting unit facing in a front direction on a front surface of the first housing.

7. The portable communication device of claim 5, wherein the second housing includes a planar top surface and a planar bottom surface, the second housing comprising a second hinge arm for defining the first hinge axis, a first slot formed in the vicinity of the second hinge arm, and a connecting arm integrated with the second hinge arm.

8. The portable communication device of claim 5, wherein the third housing includes a planar top surface and a bottom surface, the third housing comprising a speaker and a display disposed near the speaker on the bottom surface thereof.

9. The portable communication device of claim 5, wherein the battery pack comprises a second slot and is configured so that the battery pack is rotatable up to at or about 90° to at or about 100° around the third hinge axis, the rotation of the battery pack being restricted by a predetermined portion of the first housing.

10. The portable communication device of claim 5, wherein the sensing unit comprises:

a magnet attached at a predetermined position on the battery; and a sensor for detecting a field of the magnet and outputting a sensing signal according to the magnetic field detection.

* * * * *